G. P. REED.
Watch Regulator.
No. 49,154.                                      Patented Aug. 1, 1865.
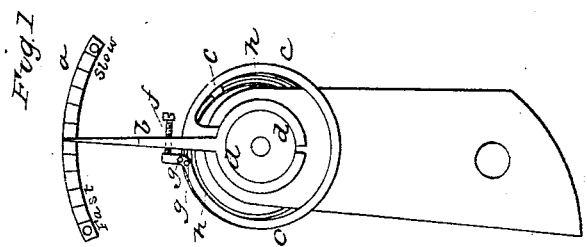
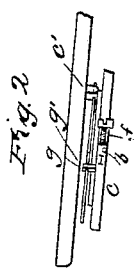
Witnesses
F. D. Kale Jr
H. E. Fisher.
Inventor
George P. Reed.
by his attorney.
R. H. Eddy.

UNITED STATES PATENT OFFICE.

GEORGE P. REED, OF ROXBURY, MASSACHUSETTS.

IMPROVEMENT IN WATCH-REGULATORS.

Specification forming part of Letters Patent No. 49,154, dated August 1, 1865.

*To all whom it may concern:*

Be it known that I, GEORGE P. REED, of Roxbury, in the county of Norfolk and State of Massachusetts, have invented an Improved Regulator for Watches or Chronometers; and I do hereby declare the same to be fully described in the following specification, and represented in the accompanying drawings, of which—

Figure 1 is a top view, and Fig. 2 an end elevation of it.

The nature of my invention consists in the application of a spring and an adjusting-screw, or their equivalents, to the pointer or handle of the regulator and to the pins which embrace the hair-spring, the whole being substantially as hereinafter explained.

In the regulation of watches with the ordinary regulator, a considerable difficulty is often experienced in moving the pointer or handle to the exact position for the watch to run with true time. The difficulty is to impart to it a sufficiently small degree of motion. The manner in which I obviate this may be described.

In the common regulator the pins or studs extend down from its pointer and on opposite sides of the hair-spring. It is the movement of the pointer or the studs on the spring by the pointer that effects the vibration or action of the hair-spring of the balance. Instead of projecting these pins from the pointer, I fasten to the said pointer $b$ a curved spring, $c$, arranged concentrically with and so as to circumscribe the ring $d$ of the pointer, and I extend the two pins $g\,g$ downward from the said spring $c$, near to its free extremity, and so as to embrace the hair-spring $h$, which is fastened in the ordinary manner at $c'$. Next I screw a screw, $f$, through the pointer and against the spring near its free end, the whole being arranged as shown in the drawings.

The manner of using this regulator may be thus described. After the handle or pointer may have been adjusted on that division of the graduated arc or scale $a$ which may be nearest to the postion for the true adjustment we have only to produce the necessary subsequent change of position of the pins by either screwing up or unscrewing the adjusting-screw, so as to vary the distance of the end of the spring from the pointer. In this way very excellent regulation can be obtained.

What I claim as my invention is—

The application of the curved spring $c$ and its adjusting-screw $f$ to the pointer $b$, in combination with the application of the hair-spring, pins, or studs to the said spring $c$, the whole being substantially as and for the purpose as explained.

GEO. P. REED.

Witnesses:
R. H. EDDY,
F. P. HALE, Jr.